(12) United States Patent
Mahle et al.

(10) Patent No.: US 9,863,251 B2
(45) Date of Patent: Jan. 9, 2018

(54) TURBOMACHINE AND TURBOMACHINE STAGE

(71) Applicant: MTU Aero Engines GmbH, Munich (DE)

(72) Inventors: Inga Mahle, Munich (DE); Jochen Gier, Karlsfeld (DE); Kai Koerber, Karlsfeld (DE); Karl Engel, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 845 days.

(21) Appl. No.: 13/687,798

(22) Filed: Nov. 28, 2012

(65) Prior Publication Data

US 2013/0156563 A1  Jun. 20, 2013

(30) Foreign Application Priority Data

Dec. 20, 2011 (EP) ..................................... 11194441

(51) Int. Cl.
   *F01D 5/14* (2006.01)
   *F01D 11/08* (2006.01)

(52) U.S. Cl.
   CPC .............. *F01D 5/141* (2013.01); *F01D 11/08* (2013.01)

(58) Field of Classification Search
   CPC ...... F01D 5/142; F01D 5/143; F05D 2240/80; F05D 2250/184
   See application file for complete search history.

(56) References Cited

U.S. PATENT DOCUMENTS

| 7,320,574 B2* | 1/2008 | Greim et al. ............... 415/173.5 |
| 2005/0100439 A1 | 5/2005 | Greim et al. |
| 2011/0243749 A1* | 10/2011 | Praisner et al. .......... 416/223 A |

FOREIGN PATENT DOCUMENTS

| EP | 1067273 | 1/2001 |
| EP | 1515000 | 9/2003 |
| EP | 2136033 | 12/2009 |
| EP | 2 372 102 A2 | 5/2011 |

(Continued)

*Primary Examiner* — Gregory Anderson
*Assistant Examiner* — Cameron Corday
(74) *Attorney, Agent, or Firm* — Davidson, Davidson & Kappel, LLC

(57) ABSTRACT

A turbomachine stage includes guide vanes and an airfoil platform forming a guide vane cascade, and rotor blades and an airfoil platform forming a rotor blade cascade. Airfoil platforms have cascade regions extending between circumferentially adjacent airfoils, and gap regions which radially and/or axially bound an axial gap extending axially between the guide vane cascade and the rotor blade cascade. A contour of at least one of these gap regions varies in the radial and/or axial direction around the circumference. A maximum extent of this contour in the radial direction toward the spoke-like pattern is circumferentially spaced from an airfoil edge of this cascade by no more than 50% of the cascade pitch, a maximum variation in the radial direction being no more than 50% of the cascade pitch and/or a maximum extent in the axial direction away from the spoke-like pattern is circumferentially spaced from an airfoil edge of this cascade by no more than 50% of the cascade pitch, a maximum variation in the axial direction being no more than 50% of the cascade pitch.

20 Claims, 2 Drawing Sheets

(56) References Cited

FOREIGN PATENT DOCUMENTS

| | | |
|---|---|---|
| EP | 2369138 | 11/2011 |
| JP | 2000073702 | 3/2000 |
| WO | WO2004113685 | 12/2004 |

\* cited by examiner

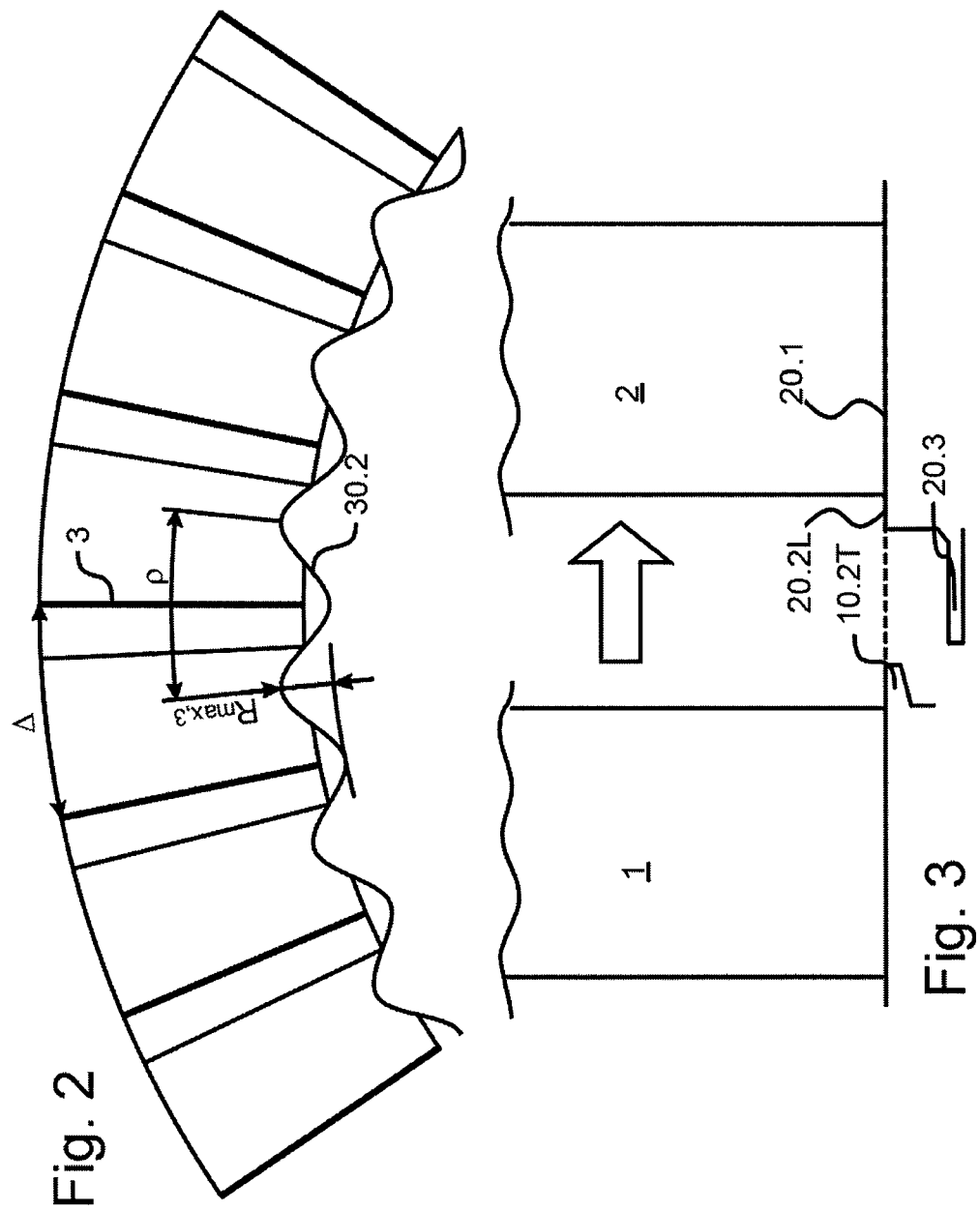

TURBOMACHINE AND TURBOMACHINE STAGE

This claims the benefit of European Patent Application EP 11194441.9, filed Dec. 20, 2011 and hereby incorporated by reference herein.

The present invention relates to a turbomachine, in particular a gas turbine, preferably an aircraft engine gas turbine, having at least one turbomachine stage, in particular a compressor stage or a turbine stage, including a guide vane cascade and a rotor blade cascade, and to such a turbomachine stage.

BACKGROUND

A turbomachine stage has a cascade of rotating rotor blades and a cascade of guide vanes disposed adjacent to the rotor blade cascade on the upstream or downstream side. The blade and vane airfoils terminate in an airfoil platform at the root end. The tip end may also be provided with an airfoil platform, for example, in the form of a guide vane or rotor blade shroud.

An axial gap is formed between the guide vane cascade and the rotor blade cascade. When the rotor blade cascade rotates, pressure gradients are formed therein, the pressure gradients varying around the circumference and causing secondary flows. For example, a rotating cascade of turbine rotor blades may force working fluid into the axial gap on its pressure side and, conversely, draw working fluid from the gap on its suction side. As a result, a compensating flow is generated, which degrades the efficiency of the turbomachine.

A gas turbine having shroudless rotor blades is disclosed in EP 2 372 102 A2, which proposes that the radially inner platforms of guide vanes and rotor blades have a non-axisymmetric contour, in particular a radially and/or axially undulated contour. This publication gives no information about the size and/or positioning of crests and troughs. According to the Figures, troughs are formed near the leading and trailing edges of the guide vanes and rotor blades, respectively.

SUMMARY OF THE INVENTION

It is an object of the present invention to improve the efficiency of a turbomachine, in particular an aircraft engine gas turbine.

A turbomachine stage according to the present invention includes a plurality of rotor blades which are preferably equidistantly distributed around the circumference and, at their root or rotor end, are connected to, in particular integrally formed with, radially inner airfoil platforms. At their tip or casing ends, the rotor blades may be connected to, in particular integrally formed with, radially outer airfoil platforms. Rotor blades may be removably or non-removably attached to, in particular integrally formed with, a rotor (member) of the turbomachine, either individually or in groups.

On the upstream and/or downstream side(s) of the cascade formed by these rotor blades, a plurality of guide vanes are preferably equidistantly distributed around the circumference and removably or non-removably attached to, in particular integrally formed with, a casing (member) of the turbomachine. To this end, the guide vanes are connected to, in particular integrally formed with, radially outer airfoil platforms. At their tip or rotor ends, the guide vanes may be connected to, in particular integrally formed with, radially inner airfoil platforms.

Guide vane platforms and/or rotor blade platforms of circumferentially adjacent blades or vanes may be removably or non-removably connected to, in particular integrally formed with, one another other.

Platform regions extending axially between the airfoil leading and trailing edges and circumferentially between adjacent airfoils, together with the airfoils themselves and, possibly, casing or rotor surface regions, define flow channels for the working fluid, and thus the rotor blade cascade or guide vane cascade, respectively. Therefore, these platform regions are hereinafter referred to as cascade regions.

However, the airfoil platforms may extend axially beyond these cascade regions on the upstream and/or downstream side(s); i.e., beyond the airfoil leading and/or trailing edges. These regions of the airfoil platforms bound an axial gap extending axially between the guide vane cascade and the rotor blade cascade and, therefore, are hereinafter collectively referred to as gap regions of the airfoil platforms.

An airfoil platform may have different such gap regions. For example, the radially inner airfoil platforms of a rotor blade cascade, called rotor platforms, may have a radial shoulder whose circumferential surface bounds the axial gap radially and whose end face bounds the axial gap axially.

If, in a preferred embodiment, an axial rotor platform extension, called "wing", is provided in the form of an annular flange which is disposed further radially inward than the cascade region defining the rotor blade cascade, then this annular flange can also form a gap region according to the present invention. Similarly, an axial annular flange of the radially inner guide vane platforms which is disposed further radially outward than such a rotor platform extension may form a gap region according to the present invention. Axial annular flanges which are formed on radially outer airfoil platforms of guide vane cascades and/or rotor blade cascades; i.e., platforms which are remote from the rotor, can also form a gap region according to the present invention.

If, in a preferred embodiment, rotor blade tips or shrouds are, in particular sealingly, disposed in a recess of the casing, the casing member in which the recess is formed may form a gap region of the guide vane platforms according to the present invention. Similarly, a radially outer rotor blade platform which is disposed in the recess of the casing may form a gap region according to the present invention.

In general, a component which is connected radially inwardly or outwardly to at least one guide vane or a rotor blade and whose contour, possibly together with additional contours, radially and/or axially bounds the axial gap between the rotor blade cascade and the guide vane cascade, may constitute a gap region of an airfoil platform according to the present invention.

An airfoil platform may have gap regions including a plurality of sections. For example, the platforms of a rotor blade cascade or a guide vane cascade may have one or more radial shoulders whose circumferential surfaces bound the axial gap radially and whose end faces bound the axial gap axially. In the case of such gap regions having a plurality of sections, the following explanations may refer to one or more, in particular to all of the sections of a gap region. Thus, for example, when the description speaks of a variation of a gap region in the radial and/or axial direction, the contour(s) of one or more circumferential surfaces may vary in the radial direction and/or the contour(s) of one or more end faces may vary in the axial direction.

In accordance with the present invention, a contour of one or more gap regions varies in the radial and/or axial direction around the circumference. As is customary in the art, a variation in the radial direction is understood, in particular, to be an outside radius R of the contour which, in polar coordinates, varies with the circumferential angle φ around the axis of rotation of the turbomachine stage, and analogously, a variation in the axial direction is understood, in particular, to be an axial coordinate X of the contour which varies with the circumferential angle. Preferably, the contour varies periodically, in particular sinusoidally:

$$R(\varphi)=R_0+\Delta R \times \sin(\Omega_R \times \varphi + \Phi_R) \text{ and/or}$$

$$X(\varphi)=X_0+\Delta X \times \sin(\Omega_x \times \varphi + \Phi_x),$$

where $$\varphi \in [0°, 360°], R_0, \Delta R, X_0, \Delta X, \Omega_R, \Omega_x, \Phi_R, \Phi_x = \text{const.}$$

or asymmetrically.

As explained above, this variation (hereinafter also referred to as undulation) may be formed solely in the radial direction, solely in the axial direction, or in both the axial and radial directions. For example, the contour of a cylindrical gap region having a smooth end face and an undulated circumferential surface varies solely in the radial direction, that of a cylindrical gap region having an undulated end face and a smooth circumferential surface varies solely in the axial direction, while that of a cylindrical gap region having an undulated end face and an undulated circumferential surface and that of conical gap region having an undulated circumferential surface vary in both the axial and radial directions.

A contour that varies in the radial direction around the circumference has a maximum extent and a minimum extent in the radial direction toward the spoke-like pattern of the respective cascade.

If the contour of a radially inner gap region; i.e., of a platform at the root end of a rotor blade or of a shroud of a guide vane, varies in the radial direction, then the contour has a maximum radius in the region of a maximum extent in the radial direction toward the spoke-like airfoil pattern of the contour; i.e., in a radially outward direction. In the case of the above-described sinusoidal variation, for example, the maximum radius is $R_0+\Delta R$. Analogously, the contour has a minimum radius in the region of a minimum extent. In the case of a sinusoidal variation, for example, the minimum radius is $R_0-\Delta R$.

Conversely, if the contour of a radially outer gap region; i.e., of a platform at the root end of a guide vane or of a shroud of a rotor blade, varies in the radial direction, then the maximum extents in the radial direction toward the spoke-like airfoil pattern of the contour; i.e., in a radially inward direction, have the minimum radii or distances from the axis of rotation of the turbomachine stage. In the case of the above-described sinusoidal variation, for example, the minimum radii are $R_0-\Delta R$. Analogously, the minimum extents have the maximum radii which, the case of a sinusoidal variation, for example, are $R_0+\Delta R$.

Therefore, for the sake of a more compact description, radially outer crests of a radially inner undulated gap region, and radially inner troughs of a radially outer undulated gap region will be uniformly referred to as maximum extent in the radial direction toward the spoke-like pattern.

Accordingly, the term "maximum variation" will be used to refer to the absolute difference between a maximum and a minimum extent which, in the case of the aforedescribed sinusoidal variation, for example, is $2 \times \Delta R$.

Analogously, a contour that varies in the axial direction around the circumference has a minimum extent and a maximum extent in the axial direction away from the spoke-like pattern of the contour. If the contour of a radially inner or a radially outer gap region of a guide vane or a rotor blade varies in the axial direction, then the maximum extent in the axial direction away from the spoke-like airfoil pattern; i.e., in an axially outward direction, has a distance or maximum axial variation from a minimal extent in the axial direction. In the case of the aforedescribed sinusoidal variation, for example, the maximum axial variation is $2 \times \Delta X$.

In accordance with the present invention, such a maximum variation in the radial direction is no more than 50%, preferably no more than 40%, and particularly no more than 30% of the pitch of this cascade, and the maximum extent in the radial direction toward the spoke-like pattern of the contour is circumferentially spaced from an airfoil edge of this cascade by no more than 50%, particularly no more than 25% of the pitch of this cascade. Additionally or alternatively, a maximum variation in the axial direction is no more than 50%, preferably no more than 40%, and particularly no more than 30% of the pitch of this cascade, and the maximum extent in the axial direction away from the spoke-like pattern of the contour is circumferentially spaced from an airfoil edge of this cascade by no more than 50%, particularly no more than 25% of the pitch of this cascade.

The term "pitch", as used herein, refers in particular to the circumferential distance between two adjacent airfoil edges, in particular, airfoil leading or trailing edges. The pitch may, in particular, be equal to a nominal circumference divided by the number n of airfoils ($2\pi R_0/n$).

By disposing the maximum axial and/or radial extents near the airfoil edges and at the same time limiting the maximum axial and/or radial variations, it is possible to achieve an improved flow through the turbomachine stage.

In a preferred embodiment, a maximum radial and/or axial extent is disposed in a pressure-side region of an airfoil leading edge; i.e., in the pressure-side half, in particular in the pressure-side quarter of the cascade pitch, as viewed in the circumferential direction. Additionally or alternatively, a maximum radial and/or axial extent may be disposed in a suction-side region of an airfoil trailing edge; i.e., in the suction-side half, in particular in the suction-side quarter of the cascade pitch, as viewed in the circumferential direction.

The undulation may be formed solely on one or more gap regions of radially inner and/or outer guide vane platforms, solely on one or more gap regions of radially inner and/or outer rotor blade platforms, or also on one or more gap regions of radially inner and/or outer platforms of both guide vanes and rotor blades. In this connection, a contour of a gap region of an airfoil platform of one of the guide vane and rotor blade cascades and an axially and/or radially opposite contour of a gap region of an airfoil platform of the other of the guide vane and rotor blade cascade may vary around the circumference, preferably identically, in particular in parallel, or with a phase offset of preferably at least 45°, in particular at least 90°, preferably at least 135° and/or preferably of no more than 270°, in particular no more than 210°, and preferably no more than 180°.

If a gap region has two opposite contours, such as an inner and an outer circumferential surface of an annular flange such as, in particular, a rotor platform extension, then these two opposite contours may vary around the circumference, preferably differently or identically, in particular in parallel, or with a phase offset of preferably at least 45°, in particular at least 90°, preferably at least 135° and/or preferably of no more than 270°, in particular no more than 210°, and preferably no more than 180°. If the two contours vary in parallel, the wall thickness of the gap region remains constant. It may equally be provided that only one of such opposite contours, in the case of an annular-flange-like rotor platform extension preferably the radially inner contour, varies while the other remains constant around the circumference.

In general, an entire contour of a gap region, for example, the entire outer circumferential surface of an annular flange, may vary around the circumference. It is equally possible that only a section of the contour has an undulation. For example, the outer circumferential surface of an annular flange may vary in the radial direction only in one or more axial sections, or an end face may vary in the axial direction only in one or more radial sections.

A radial variation of a contour of a gap region of an airfoil platform of a cascade may be constant in the axial direction, so that troughs and crests are oriented parallel to the axis of rotation of the turbomachine stage. Equally, a radial variation of a contour of a gap region of an airfoil platform of a cascade may also vary in the axial direction, so that troughs and crests extend at an angle to the axis of rotation. In particular, a phase offset may be provided which varies with the axial position x, preferably linearly:

$$R(\varphi,x)=R_0+\Delta R \times \sin(\Omega_R \times \varphi + \Phi_R \times x)$$

Similarly, an axial variation of a contour of a gap region of an airfoil platform of a cascade may be constant in the radial direction, so that troughs and crests are oriented perpendicularly to the axis of rotation of the turbomachine stage. Equally, an axial variation of a contour of a gap region of an airfoil platform of a cascade may also vary in the radial direction, so that troughs and crests are inclined at an angle to the axis of rotation. Here, too, a phase offset may be provided which varies with the radial position r, preferably linearly:

$$X(\varphi,r)=X_0+\Delta X \times \sin(\Omega_x \times \varphi + \Phi_x \times r)$$

In a preferred embodiment, in addition to at least one gap region, the cascade region of the airfoil platform varies as well, at least partially, around the circumference in one of the ways described above. In an advantageous refinement, a gap region whose contour varies around the circumference merges smoothly into this cascade region, especially in such a way that a trough of the gap region contour merges into a trough of the cascade region, [and] a crest of the gap region contour merges into a crest of the cascade region. As is customary in the art, the term "smooth transition" is used, in particular, to refer to a transition which has no sharp edges or bends, but which preferably has a continuous curvature.

BRIEF DESCRIPTION OF THE DRAWINGS

Further features and advantages will become apparent from the dependent claims and the exemplary embodiments. To this end, the drawings show, partly in schematic form, in:

FIG. 2: an axial elevation view of a cascade of guide vanes or rotor blades of a gas turbine stage according to the present invention including radially inner airfoil platforms whose gap region contour varies in the radial direction around the circumference; and FIG. 3: a meridional section through a gas turbine stage according to the present invention having an annular-flange-like platform extension.

DETAILED DESCRIPTION

Figure 1:
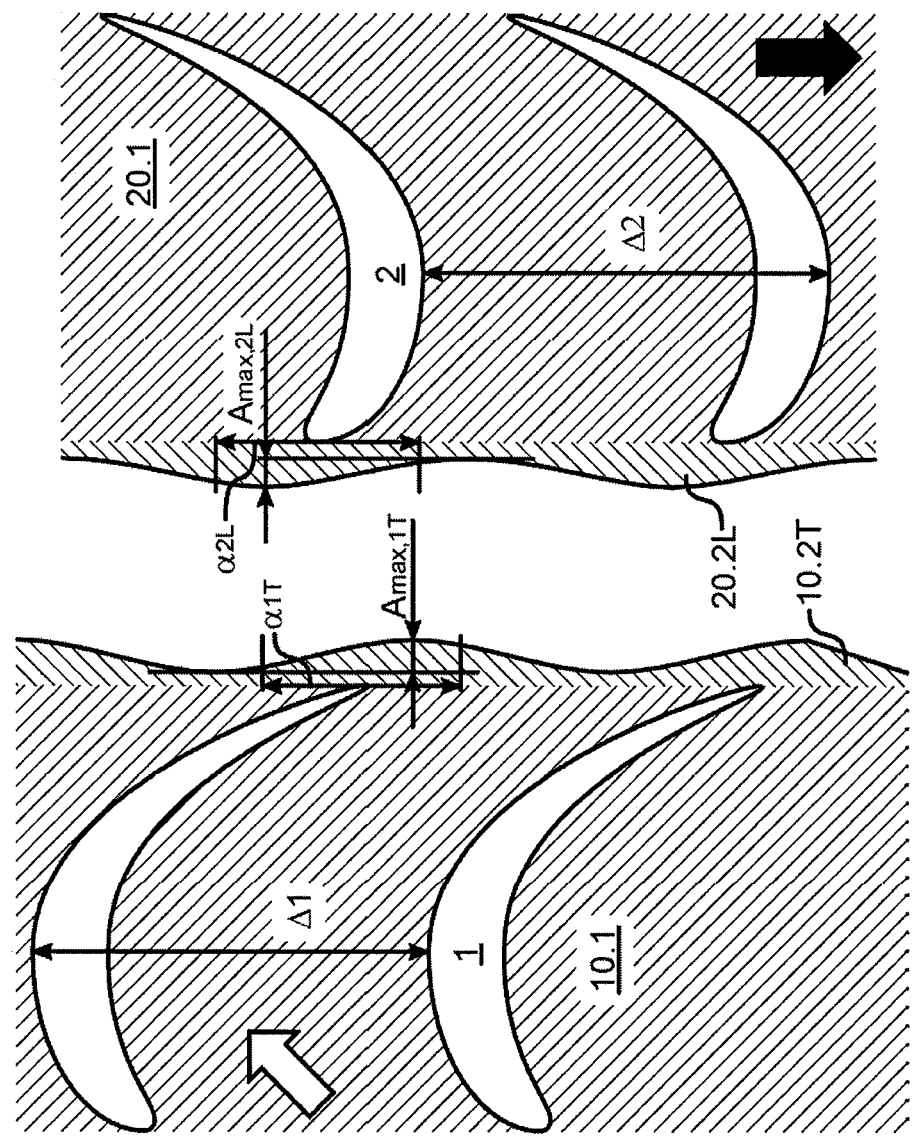
FIG. 1: a developed view of a portion of a gas turbine stage according to the present invention including a guide vane cascade and a rotor blade cascade having radially inner airfoil platforms whose gap region contour varies in the axial direction around the circumference.

FIG. 1 shows a developed view of a portion of a gas turbine stage according to the present invention, including a stationary cascade of guide vanes 1 and, opposite thereto, a rotating cascade of rotor blades 2. The rotation is indicated by a filled vertical arrow, the flow of working fluid is indicated by an empty arrow in the region of the guide vane cascade. This configuration is merely exemplary for purposes of illustration. The present invention may be used equally in turbine and compressor stages, where the guide vane cascade is disposed upstream and/or downstream of the rotor blade cascade.

Integrally formed with the airfoils 1, 2 are radially inner airfoil platforms, which are shown from above in FIG. 1. Each airfoil may either have a separate airfoil platform, or several or all of the airfoils of a cascade may be connected to, in particular integrally formed with, the same airfoil platform which, in accordance with the present invention, may then be imagined as being divided into separate airfoil platforms associated with the individual airfoils. Therefore, FIG. 1 does not show any airfoil platform boundaries in the circumferential direction (vertically in FIG. 1).

A cascade region 10.1 of the guide vane platforms and a cascade region 20.1 of the rotor blade platforms extend axially between the respective leading edge (left in FIG. 1) and the respective trailing edge (right in FIG. 1), said cascade regions being hatched from top left to bottom right in FIG. 1.

The cascade regions merge axially into respective gap regions 10.2T and 20.2L beyond the respective airfoil leading or trailing edges, said gap regions being hatched from bottom left to top right in FIG. 1. Gap regions 10.2T and 20.2L each have substantially the shape of a radial shoulder whose circumferential surface facing toward the spoke-like pattern of the respective cascade and whose end face facing toward the respective other airfoil cascade radially and axially bound a radially inner axial gap between the rotor blade cascade and the guide vane cascade.

As can be seen in the elevation or developed view of FIG. 1, the contour of trailing-edge gap region 10.2T of the guide vane cascade, and more particularly its end face facing the rotor blade cascade, varies in the axial direction around the circumference; i.e., in the vertical direction in FIG. 1. That is, the generating lines of the end face extending from the axis of rotation of the turbomachine to the peripheral edge of the radial shoulder have different axial positions, so that the end face has a maximum axial extent at certain circumferential positions and a minimum axial extent at other circumferential positions in a direction away from the guide blade cascade; i.e., toward the right in FIG. 1. In the exemplary embodiment, the axial positions of the generating lines vary sinusoidally with an amplitude of $A_{max,\ 1T}/2$, which results in a maximum axial variation of $A_{max,\ 1T}$, which is illustrated in FIG. 1.

The maximum axial extent of trailing-edge gap region 10.2T of the guide vane cascade is located near a guide blade trailing edge. In this regard, FIG. 1 shows a region $\alpha_{1T}$ which is 50% of guide vane pitch $\Delta 1$ ($\alpha_{1T}=0.5\ \Delta 1$). It can be seen that the maximum axial extent of trailing-edge gap region 10.2T of the guide vane cascade is located in this region $\alpha_{1T}$ around the guide vane trailing edge; i.e., at a distance of no more than 50% of guide vane pitch $\Delta 1$.

Analogously, the contour of leading-edge gap region 20.2L of the rotor blade cascade, and more particularly its end face facing the upstream guide vane cascade, varies in the axial direction around the circumference, so that the end face has a maximum axial extent at certain circumferential positions and a minimum axial extent at other circumferential positions in a direction away from the rotor vane cascade; i.e., toward the left in FIG. 1. In the exemplary embodiment, the axial positions of the generating lines vary sinusoidally with an amplitude of $A_{max, 2L}/2$, which results in a maximum axial variation of $A_{max, 2L}$, which is illustrated in FIG. 1.

The maximum axial extent of leading-edge gap region 20.2L of the rotor blade cascade is located near a rotor vane leading edge. In this regard, FIG. 1 shows a region $\alpha_{2L}$ which is 50% of rotor vane pitch $\Delta 2$ ($\alpha_{2L}=0.5\times\Delta 2$). It can be seen that the maximum axial extent of leading-edge gap region 20.2L of the rotor blade cascade is located in this region $\alpha_{2L}$ around the rotor blade leading edge; i.e., at a distance of no more than 50% of rotor vane pitch $\Delta 2$.

The generating lines may be perpendicular to the axis of rotation of the turbomachine, or inclined thereto at the same angle or at an angle that varies in the circumferential direction. In the exemplary embodiment, the generating lines are perpendicular to the axis of rotation.

FIG. 2 shows an axial elevation view of a cascade of guide vanes or rotor blades of a gas turbine stage according to the present invention having radially inner airfoil platforms whose gap region contour varies in the radial direction around the circumference. In particular, this gas turbine stage may be the one described hereinabove with reference to FIG. 1, so that a radial undulation is combined with an axial undulation. Therefore, in the following, reference is made to the above description and only the aspects of the radial undulation will be described. It is equally possible to provide only an axial undulation, as described hereinabove with reference to FIG. 1, or only a radial undulation, such as will be described hereinafter.

In the axial elevation view of FIG. 2, there are shown bolded edges of airfoils 3 of a cascade of a gas turbine. The edges may be leading or trailing edges of either guide vanes or rotor blades, so that FIG. 2 may be an elevation view looking in the direction of the flow or one looking in a direction opposite to the flow direction. Thus, FIG. 2 is a compact representation of different aspects. For example, it can be considered to be an elevation view looking at rotor blades in the direction of the flow. In this case, the bolded edges correspond to leading edges, airfoils 3 correspond to, for example, rotor blades 2 of FIG. 1, and radial inner gap region 30.2 corresponds to their leading-edge gap region 20.2L, the view showing mainly the pressure sides of the respective rotor blades. FIG. 2 can equally be considered to be an elevation view looking at guide vanes in a direction opposite to the flow direction and showing only the suctions sides of the respective guide vanes. In this case, the bolded edges correspond to trailing edges, airfoils 3 correspond to, for example, guide vanes 1 of FIG. 1, and radial inner gap region 30.2 corresponds to their trailing-edge gap region 10.2T.

The circumferential surface of gap region 30.2 has alternating maximum and minimum extents extending radially outward; i.e., in a direction toward the spoke-like pattern (upwardly in FIG. 2). It can be seen that the circumferential surface of gap region 30.2 varies sinusoidally in the circumferential direction with an amplitude $R_{max, 3}/2$. The maximum radial extent of gap region 30.2 is located near the edge of airfoil 3. In this regard, FIG. 2 shows a region $\rho$ which is 50% of guide vane pitch $\Delta$ ($\rho=0.5\times\Delta$). It can be seen that the maximum radial extent of gap region 30.2 in a direction toward the spoke-like pattern (upwardly in FIG. 2) is located in this region $\rho$ around the airfoil edge; i.e., at a distance of no more than 50% of cascade pitch $\Delta$.

If FIG. 2 is considered, for example, to be an elevation view looking at rotor blades in the direction of the flow, then the maximum radial extent of leading-edge gap region 30.2 is located (only just) in the pressure-side half of the segment between two successive rotor blade leading edges. If FIG. 2 is considered, for example, to be an elevation view looking at guide vanes in a direction opposite to the flow direction, then the maximum radial extent of trailing-edge gap region 30.2 is located (only just) in the suction-side half of the segment between two successive guide vane trailing edges.

In addition or as an alternative to a radial-shoulder-shaped gap region 20.2L, the inner rotor blade platforms may have a rotor blade platform extension 20.3, which is preferably shaped like an annular flange, as illustrated in FIG. 3. The radially outer circumferential surface (the upper in FIG. 3) and/or the radially inner circumferential surface (the lower in FIG. 3) of this annular flange 20.3 may have a radial undulation along its entire length or part thereof, such as described hereinabove with reference to gap region 20.2L. However, for the sake of clarity, no such radial undulation is shown in FIG. 3. In particular, annular flange 20.3 may have a constant wall thickness when the two circumferential surfaces vary in parallel around the circumference.

Additionally or alternatively, the axial end face of annular flange 20.3 and/or the radially inner facing circumferential surface of gap region 10.2T may have an undulation.

In addition or as an alternative to radial-shoulder-shaped gap region 20.2L and/or a rotor blade platform extension 20.3, gap regions of radially outer rotor blade platforms and/or gap regions of radially outer guide vane platforms receiving the radially outer rotor blade platforms may have a radial and/or axial undulation (not shown). In a modification (also not shown), leading-edge gap regions of guide vanes and/or trailing-edge regions of rotor blades may additionally or alternatively also have a radial and/or axial undulation, such as described hereinabove with reference to FIGS. 1, 2.

LIST OF REFERENCE NUMERALS 1 guide vane
2 rotor blade
3 guide vane or rotor blade (edge)
10.1/20.1 cascade region of the radially inner airfoil platform of the rotor blade or guide vane cascade
10.2T trailing-edge gap region of the radially inner airfoil platform of the guide vane cascade
20.2L leading-edge gap region of the radially inner airfoil platform of the rotor blade cascade
30.2 gap region of a radially inner airfoil platform of a (rotor blade or guide vane) cascade
20.3 platform extension ("wing", gap region) of the rotor blade platform
$A_{max, 1T}$ maximum axial variation/extent of the trailing-edge gap region
$A_{max, 2L}$ maximum axial variation/extent of the leading-edge gap region
$R_{max, 3}$ maximum radial variation/extent
$\Delta(\frac{1}{2})$ cascade pitch (of the rotor blade or guide vane cascade)

What is claimed is:

1. A turbomachine stage comprising:
guide vanes and at least one of a radially inner and radially outer guide vane airfoil platform defining a guide vane cascade, the guide vane airfoil platform having a guide vane platform cascade region and a guide vane gap region; and
rotor blades and at least one of a radially inner and radially outer rotor blade airfoil platform defining a rotor blade cascade, the rotor blade airfoil platform having a rotor blade platform cascade region and a rotor blade gap region, the rotor blade cascade being adjacent to the guide vane cascade,
the guide vane gap region and the rotor blade gap region at least one of radially and axially bounding an axial gap extending axially between the guide vane cascade and the rotor blade cascade,
a contour of at least one of the guide vane and rotor blade gap regions varying in at least one of the radial and axial direction around a circumference,
at least one of (a) and (b) being true:
(a) a maximum extent of the contour in the radial direction toward a spoke-like pattern of the respective guide vane or rotor blade cascade being circumferentially spaced from a respective airfoil edge of the respective guide vane or rotor blade cascade by no more than 50% of the pitch of the respective guide vane or rotor blade cascade, a maximum variation of the contour in the radial direction being no more than 50% of the pitch of the respective guide vane or rotor blade cascade; and
(b) a maximum extent of the contour in the axial direction away from the spoke-like pattern is circumferentially spaced from the respective airfoil edge of the respective guide or rotor blade cascade by no more than 50% of the pitch of the respective guide vane or rotor vane cascade, a maximum variation of the contour in the axial direction being no more than 50% of the pitch of the respective guide vane or rotor blade cascade;
and
whereby a radially opposite contour of the other of the guide vane and the rotor blade gap regions varies identically around the circumference as the contour but with a phase shift, wherein:
the contour varies according to $R(\varphi)=R_0+\Delta R \times \sin(\Omega_R \times \varphi)$ and the radially opposite contour varies with the phase shift $PS(x)$ according to $R(\varphi, x)=R_0+\Delta R \times \sin(\Omega_R \times \varphi + PS(x))$, wherein the phase shift $PS(x)$ varies with the axial position x,
the contour varies according to $X(\varphi)=X_0+\Delta X \times \sin(\Omega_x \times \varphi)$ and the radially opposite contour varies with the phase shift $PS(r)$ according to $X(\varphi, r)=X_0+\Delta X \times \sin(\Omega_x \times \varphi + PS(r))$, wherein the phase shift $PS(r)$ varies with the radial position r,
wherein $\varphi \in [0°, 360°]$, $R_0$, $\Delta R$, $X_0$, $\Delta X$, $\Omega_R$, $\Omega_x$, $\Phi_R$, $\Phi_x$ are constant, R defines a variation in a radial direction, and X defines a variation in an axial direction.

2. The turbomachine stage as recited in claim 1 wherein the contour varies in the radial direction, the maximum extent of the contour in the radial direction toward the spoke-like pattern of the respective guide vane or rotor blade cascade being circumferentially spaced from a respective airfoil edge of the respective guide vane or rotor blade cascade by no more than 25% of the pitch of the respective guide vane or rotor blade cascade.

3. The turbomachine stage as recited in claim 2 wherein the maximum variation in the radial direction is no more than 40% of the pitch of the respective guide vane or rotor blade cascade.

4. The turbomachine stage as recited in claim 1 wherein the contour varies in the radial direction and with the maximum variation in the radial direction being no more than 40% of the pitch of the respective guide vane or rotor blade cascade.

5. The turbomachine stage as recited in claim 1 wherein the contour varies in the axial direction, the maximum extent of the contour in the axial direction away from the spoke-like pattern being circumferentially spaced from the respective airfoil edge of the respective guide or rotor blade cascade by no more than 25%.

6. The turbomachine stage as recited in claim 5 wherein the maximum variation in the axial direction is no more than 40% of the pitch of the respective guide vane or rotor blade cascade.

7. The turbomachine stage as recited in claim 1 wherein the contour varies in the axial direction and with the maximum variation in the axial direction being no more than 40% of the pitch of the respective guide vane or rotor blade cascade.

8. The turbomachine stage as recited in claim 1 wherein the respective maximum extent is disposed in the pressure-side region of an airfoil leading edge or in the suction-side region of an airfoil trailing edge.

9. The turbomachine stage as recited in claim 1 wherein the contour varies radially and axially.

10. The turbomachine stage as recited in claim 1 wherein the contour varies radially but is constant in the axial direction.

11. The turbomachine stage as recited in claim 1 wherein the respective guide vane platform or rotor blade platform gap region whose contour merges smoothly into the respective guide vane or rotor blade cascade region.

12. The turbomachine stage as recited in claim 1 wherein the contour varies periodically.

13. A turbomachine comprising at least one turbomachine stage as recited in claim 1.

14. A gas turbine comprising at least one turbomachine stage as recited in claim 1.

15. An aircraft engine gas turbine comprising at least one turbomachine stage as recited in claim 1.

16. A compressor stage comprising the turbomachine stage as recited in claim 1.

17. A turbine stage comprising the turbomachine stage as recited in claim 1.

18. The turbomachine stage as recited in claim 1 wherein the contour varies axially.

19. The turbomachine stage as recited in claim 1 wherein the phase shift $PS(r)$ varies linearly with the radial position r according to $PS(x)=\Phi_x \times r$.

20. The turbomachine stage as recited in claim 1 wherein the phase shift $PS(x)$ varies with the axial position x according to $PS(x)=\Phi_R \times x$.

* * * * *